United States Patent

Brandstetter et al.

[11] 3,989,014
[45] Nov. 2, 1976

[54] IGNITED INTERNAL COMBUSTION ENGINE OPERATED WITH CHARGE STRATIFICATION

[75] Inventors: Walter Brandstetter, Gifhorn; Gerd Decker, Vorsfelde; Kurt Reichel, Wolfsburg, all of Germany

[73] Assignee: Volkswagenwerk Aktiengesellschaft, Germany

[22] Filed: Feb. 28, 1975

[21] Appl. No.: 554,086

[30] Foreign Application Priority Data
Mar. 8, 1974 Germany............................ 2411079

[52] U.S. Cl. ............................ 123/32 SP; 123/330; 123/122 A
[51] Int. Cl.² ......................................... F02M 31/00
[58] Field of Search............. 123/32 C, 32 D, 32 K, 123/32 ST, 32 SD, 33 D, 122 A, 122 AB, 122 G

[56] References Cited
UNITED STATES PATENTS

| | | | |
|---|---|---|---|
| 1,123,406 | 1/1915 | Severin et al. ..................... | 123/32 D |
| 1,329,797 | 2/1920 | Raabe................................. | 123/32 D |
| 1,576,254 | 3/1926 | Sumner ............................... | 123/32 SP |
| 2,057,318 | 10/1936 | Schwaiger........................... | 123/32 D |
| 2,808,036 | 10/1957 | Von Seggern et al............ | 123/32 SP |
| 2,855,908 | 10/1958 | Pflaum............................... | 123/32 D |
| 3,867,915 | 2/1975 | Sakurai et al. .................... | 123/32 SP |
| 3,890,942 | 6/1975 | Date et al........................... | 123/122 AB |

*Primary Examiner*—Charles J. Myhre
*Assistant Examiner*—Paul Devinsky
*Attorney, Agent, or Firm*—Brumbaugh, Graves, Donohue & Raymond

[57] ABSTRACT

An internal combustion engine with charge stratification and spark ignition comprises a main combustion chamber and an auxiliary combustion chamber, the main combustion chamber and the auxiliary combustion chamber being interconnected by a short passage. Hot gases flow past an outer surface of the auxiliary combustion chamber in heat exchange contact therewith for rapidly heating the auxiliary combustion chamber to a temperature within an optimum range to prevent condensation from forming in the auxiliary combustion chamber.

7 Claims, 1 Drawing Figure

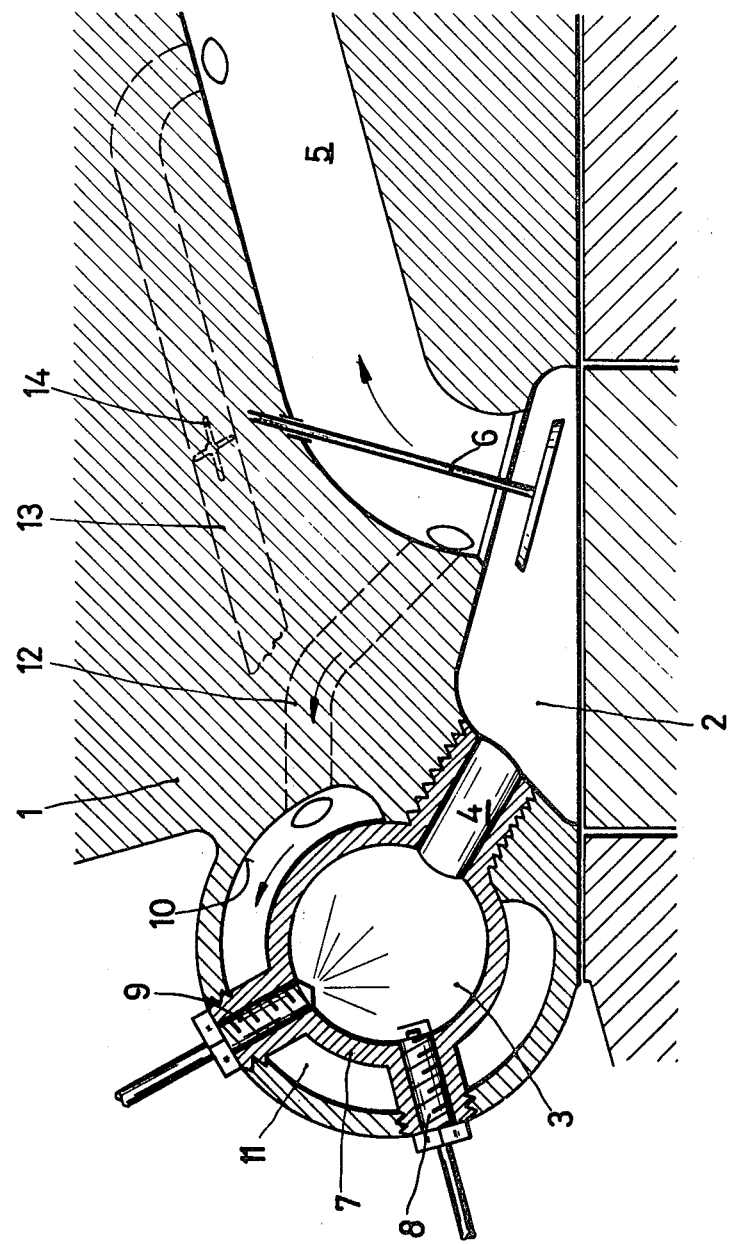

IGNITED INTERNAL COMBUSTION ENGINE OPERATED WITH CHARGE STRATIFICATION

BACKGROUND OF THE INVENTION

The present invention relates essentially to a spark ignited internal combustion engine operated with charge stratification having a main combustion chamber and an auxiliary combustion chamber or prechamber connected to the main combustion chamber by means of a short passage. The auxiliary combustion chamber is provided with a fuel delivery device and an ignition device for igniting a combustible fuel-air mixture which is richer, in fuel content, than combustible gases in the main combustion chamber.

Spark ignited internal combustion engines of the type operated with stratified charges have been known for many years. Although many variations of this type of internal combustion engine have been developed, the fundamental concept of all stratiified charge engines has been, through structural measures, to diversify the mixture composition of the cylinder charge, at the instant of ignition, in such a manner that an ignitable fuel-rich mixture is present in the immediate vicinity of the spark plug, while the charge in the remaining combustion chamber is adjusted to properly coincide with the prevailing operating conditions of the engine. This latter combustion charge may therefore consist of a fuel-lean mixture or even of air.

Heretofore such engine designs have been aimed at ensuring the safe ignition of the cylinder charge, notwithstanding wide variations in the total mixture composition, and facilitating carburetor-fueled operation at higher compression ratios without reaching the knock limit. Currently, however, the stratified charge method is viewed primarily as an expedient for reducing the noxious substances, e.g., nitric oxides, contained in the engine emissions.

In addition to the internal combustion engines wherein the stratification of the charge is achieved by a precisely timed injection of the fuel into a turbulent stream of air produced in the combustion chamber, other stratified charge internal combustion engines are known wherein the combustion chamber is divided into a main combustion chamber, delimited by the piston, and an auxiliary combustion chamber or prechamber in communication with the main combustion chamber and arranged separately in the cylinder head. The auxiliary combustion chamber is provided with an ignition device, e.g., a spark plug, and a fuel delivery device consisting either of a fuel injection nozzle or an auxiliary intake valve for delivery of a fuel-rich mixture prepared by mixture formation device. The auxiliary combustion chamber is connected with the main combustion chamber by a short pathage so that, following ignition of the fuel-rich charge present in the auxiliary combustion chamber, a flame front can advance into the main combustion chamber for the purpose of igniting the residual cylinder charge in the main combustion chamber. Accordingly, the residual cylinder charge may be much leaner, in fuel content, than the charge in the auxiliary combustion chamber and may be varied in dependence upon the engine load, whereby delayed combustion occurs with lower combustion peak temperatures and peak pressures.

In operation of the internal combustion engines of this type, it has been found that the wall temperature of the auxiliary combustion chamber has a decisive influence on the preparation and homogenization of the fuel-rich mixture in the auxiliary combustion chamber. More particularly, during the cold starting and warming-up phase of the internal combustion engine, i.e., when the walls of the auxiliary combustion chamber have not yet attained operating temperatures, the fuel of the comparatively fuel-rich mixture present in the auxiliary combustion chamber has a tendency to condense heavily on the cold auxiliary combustion chamber walls. Due to the reduction in the fuel content of the auxiliary combustion chamber mixture caused by this condensation, defective operation of the internal combustion engine occurs resulting in misfiring, stalling, and the like. In an effort to compensate for the reduction in fuel content, an increase in the quantity of fuel delivered to the auxiliary combustion chamber, during these critical operating periods, results in the faulty combustion of the increased quantity of fuel which can be only imperfectly combusted, thereby increasing the noxious substances in the engine emissions.

On the other hand, when the walls of the auxiliary combustion chamber attain excessively high temperatures, resulting from higher loads on the internal combustion engine, there exists the danger of spontaneous ignition. To avert these shortcomings, a temperature ranging from 200° to 300° C may be considered a favorable wall temperature for the auxiliary combustion chamber. However, it is also desirable that such a temperature range be attained as rapidly as possible after the cold starting of the internal combustion engine and that the temperature be maintained, if possible, throughout the entire operation of the engine.

An internal combustion engine described in German Offenlegungsschrift No. 2,302,015 comprises an auxiliary combustion chamber consisting of a metal tube which is heated by means of an electric heating coil wrapped around the metal tube. However, this design necessitates increased construction cost, due to the structural modifications required to accommodate the heating coil. On the other hand, because the energy consumed by the electric heating coil, in order to effectively heat the auxiliary combustion chamber, creates a considerable additional energy requirement, operating cost is also increased.

SUMMARY OF THE INVENTION

It is an object of the present invention to provide a spark ignited internal combustion engine, of the type operating with charge stratification, which avoids the difficulties and disadvantages of the prior art engines noted above.

This object, as well as other objects which will become apparent in the discussion that follows, are achieved, according to the present invention, by raising the temperature of the auxiliary combustion chamber wall, as soon as possible after the cold starting of the internal combustion engine, to an optimum temperature range and maintaining the temperature, if possible, within the optimum range throughout the entire operating period of the engine.

In accordance with the present invention, the auxiliary combustion chamber is formed by a thin-walled shell which is adapted to be brought into heat exchange contact with a hot gas flow. Preferably, the thin-walled shell is positioned in a cylinder head of the internal combustion engine in such a manner that an intervening space or interspace is formed between an outer surface of the auxiliary combustion chamber and surrounding walls of the cylinder head. A supply conduit communicates with the interspace for delivering hot gases into the interspace, while a return conduit communicates with the interspace for discharging the hot gases from the interspace. Because the interspace substantially surrounds the thin-walled shell of the auxiliary combustion chamber, hot gases may flow along substantially the entire outer surface of the auxiliary combustion chamber, whereby the temperature of the thin-walled shell can be rapidly raised to the desired optimum temperature range.

In order to regulate the supply of hot gases, either the supply or return conduit may contain a valve, which is preferably controllable as a function of temperature in such a manner that it is open only during the cold starting and the warming-up phase of the internal combustion engine. In this manner, it is ensured that the hot gases heat the auxiliary combustion chamber only during these especially critical operating periods and that, subsequently, when the internal combustion engine has attained its operating temperature, the heating is suspended.

In accordance with another embodiment of an internal combustion engine according to the present invention, the thin-walled shell forming the auxiliary combustion chamber may be a heat-resistant material having a low heat absorption capacity. By utilizing an auxiliary combustion chamber with a thin-walled shell having a low heat absorption capacity and which is spacedly positioned a distance from the surrounding walls of the cylinder head, the heat supplied to the outer surface of the auxiliary combustion chamber by the hot gases flowing through the interspace may be rapidly conducted to an inner surface of the auxiliary combustion chamber.

Although a preferred embodiment of the present invention provides the return and supply conduits communicating between the interspace and an exhaust conduit leading from the main combustion chamber so that the interspace receives the hot exhaust gases emerging from the main combustion chamber, it is also possible to heat the auxiliary combustion chamber by way of hot air and the like originating from an independent source. However, according to the preferred embodiment, the energy needed for heating the auxiliary combustion chamber is, without disadvantageously limiting the energy of the internal combustion engine, supplied by the hot exhaust gases which possess the sufficiently high temperature, even during cold starting, required to heat the auxiliary combustion chamber.

Thus, there is provided, in accordance with the present invention, a novel and improved internal combustion engine with charge stratification and spark ignition in which the auxiliary combustion chamber may be heated at comparatively little expense and effort so that unfavorable operating behavior characterized by misfirings and the like, during the cold starting and the warming-up phase of the engine, can be substantially improved. More particularly, elimination of the misfirings and the like substantially reduces the amount of unfavorable noxious substances in the engine emissions.

BRIEF DESCRIPTION OF THE DRAWINGS

For a further understanding of the present invention, reference may be made to the accompanying drawing, in which the single FIGURE is a cross-sectional view through a cylinder head of an internal combustion engine operated with charge stratification and spark ignition.

DESCRIPTION OF THE PREFERRED EMBODIMENTS

Referring now to the drawing, there is shown a cylinder head 1 of an internal combustion engine having a main combustion chamber 2 and an auxiliary combustion chamber 3 connected with the main combustion chamber 2 by a connecting passage 4. An exhaust conduit 5 for discharging ignited combustible gases from the main combustion chamber communicates with the main combustion chamber 2 and is controlled by a conventional exhaust valve 6. An intake conduit (not shown) for delivering a fuel-air-mixture to the main combustion chamber also communicates with the main combustion chamber 2 and is controlled by a conventional intake valve (not shown).

As shown, the auxiliary combustion chamber 3 may be a substantially spherical, thin-walled shell 7 which is provided with openings for accommodating a spark plug 8 and a fuel injection nozzle 9 and/or an additional auxiliary inlet valve (not shown). The nozzle 9 injects fuel into the auxiliary combustion chamber 3, while the spark plug 8 ignites a fuel-air mixture in the auxiliary combustion chamber 3. The flame front created by the ignition of the fuel-air mixture advances through the connecting passage 4 into the main combustion chamber 2 to ignite the fuel-air-mixture therein. The fuel-air-mixture in the main combustion chamber 2 is preferably leaner, in fuel content, than the fuel-air mixture in the auxiliary combustion chamber 3 and may be supplied by a mixture formation device in the intake conduit, i.e. by a carburetor or by a fuel injection device.

The auxiliary combustion chamber 3 is positioned within a cavity 10 in the cylinder head 1, e.g., by casting, in such a manner that an interspace 11 is formed between the outer surface of the thin-walled shell 7 and the surrounding walls of the cylinder head 1. The interspace 11 communicates through a supply conduit 12 with a front portion of the exhaust conduit 5 and through a return conduit 13 with a back portion, as viewed in the indicated direction of exhaust gas flow, of the exhaust conduit 5. In this manner, hot exhaust gases from the main combustion chamber 2 flow through the interspace 11 in direct heat exchange contact with the outer surface of the thin-walled shell 7, thereby giving off part of their heat warm-up the thin-walled shell 7 of the auxiliary combustion chamber 3.

In order to regulate the heating of the auxiliary combustion chamber 3, a valve 14, in the form of a butterfly valve or the like, may be associated with the return conduit 13 whose opening into the interspace 11 is not shown in the drawing. The valve 14 is actuated by an adjusting device (not shown) which is controlled as a function of temperature. When a temperature-dependent valve is employed, the temperature in a designated part of the internal combustion engine, e.g., the cooling system, may be used as a reference value for programming the valve 14 into a closed position, when the internal combustion engine has reached its operating temperature, i.e., when the warming-up phase has ended, to prevent the hot exhaust gases from flowing through the interspace 11.

By utilizing the hot exhaust gases emerging from the main combustion chamber 2 to heat the auxiliary combustion chamber 3 during the cold starting and the warming-up phase of the internal combustion engine, the fuel components of the fuel-air mixture present in the auxiliary combustion chamber 3 are rapidly evaporated during these especially critical operating periods. Thus, the formation of a homogeneous and easily ignitable fuel-air mixture is ensured, thereby contributing to perfect ignition and combustion products low in noxious substances.

As an alternative to the temperature-dependent valve 14, the valve 14 may also be controlled as a function of time. For example, the valve 14 may be programmed into a closed position by means of a timing circuit which would actuate the valve 14 after a given period of time following the starting of the internal combustion engine. The time period would be of a length calculated to permit the auxiliary combustion chamber to be warmed to a sufficiently high temperature.

It will be understood that the above described embodiments are merely exemplary and that persons skilled in the art may make many variations and modifications without departing from the spirit and scope of the invention. All such modifications and variations are intended to be included within the scope of the invention as defined in the appended claims.

We claim:

1. In a spark ignited internal combustion engine operated with charge stratification and including a cylinder head having a cavity defined by surrounding walls of the cylinder head, a main combustion chamber, an auxiliary combustion chamber mounted in the cavity and connected to the main combustion chamber by a connecting passage, fuel delivery means for supplying fuel to the auxiliary combustion chamber, spark ignition means for igniting a fuel-air mixture in the auxiliary combustion chamber, an intake conduit communicating with the main combustion chamber and an exhaust conduit communicating with the main combustion chamber; the improvement wherein:

the auxiliary combustion chamber is a thin-walled shell, the outer surface of the thin-walled shell being spacedly positioned from the surrounding walls of the cylinder head to form an interspace, said improvement further comprising a supply conduit communicating between the exhaust conduit and the interspace for supplying exhaust gases to the interspace, a return conduit communicating between the interspace and the exhaust conduit for discharging exhaust gases from the interspace and valve means in one of the conduits communicating with the interspace for controlling the flow of exhaust gases to and from the interspace, the valve means remaining open until the thin-walled shell is heated to within an optimum range so that exhaust gases flow through the interspace in heat exchange contact with the outer surface of the thin-walled shell for rapidly heating the thin-walled shell to a temperature within the optimum range to prevent condensation of fuel from forming in the thin-walled shell, and when the optimum range is reached the valve means closing to prevent exhaust gases from flowing through the interspace so that the temperature of the thin-walled shell does not exceed the optimum range.

2. The internal combustion engine of claim 1, wherein the valve means is controlled as a function of temperature.

3. The internal combustion engine of claim 1, wherein the valve means is designed such that exhaust gases are supplied to the interspace only during the cold starting and the warming-up phase of the internal combustion engine.

4. The internal combustion engine of claim 1, wherein the valve means is controlled as a function of time.

5. The internal combustion engine of claim 1, wherein the thin-walled shell of the auxiliary combustion chamber is a heat-resistant material having a low heat absorption capacity, whereby the heat supplied to the outer surface of the thin-walled shell by the exhaust gases in the interspace is rapidly conducted to the inner surface of the thin-walled shell.

6. The internal combustion engine of claim 2, wherein the temperature in a designated part of the internal combustion engine is used for closing the valve when the internal combustion engine reaches operating temperature.

7. The internal combustion engine of claim 4, wherein the time period is of a length calculated to permit the thin-walled shell to be heated to within the optimum range.

* * * * *